United States Patent
Dengler et al.

(10) Patent No.: US 7,856,869 B2
(45) Date of Patent: Dec. 28, 2010

(54) DEVICE AND METHOD FOR CHECKING A TIRE IN PARTICULAR BY MEANS OF AN INTERFEROMETRIC MEASURING METHOD

(76) Inventors: Stefan Dengler, Mauswiesenweg 10, Calw-Stammheim (DE) 75365; Bernward Maehner, Landsberger Strasse 51, Gilching (DE) 82205

( * ) Notice: Subject to any disclaimer, the term of this patent is extended or adjusted under 35 U.S.C. 154(b) by 176 days.

(21) Appl. No.: 12/295,532

(22) PCT Filed: Mar. 30, 2007

(86) PCT No.: PCT/EP2007/053073

§ 371 (c)(1),
(2), (4) Date: Sep. 30, 2008

(87) PCT Pub. No.: WO2007/113231

PCT Pub. Date: Oct. 11, 2007

(65) Prior Publication Data

US 2009/0282905 A1    Nov. 19, 2009

(30) Foreign Application Priority Data

Mar. 31, 2006    (DE) .................. 10 2006 015 123

(51) Int. Cl.
*G01M 17/02* (2006.01)
(52) U.S. Cl. ........................................... 73/146
(58) Field of Classification Search .................. None
See application file for complete search history.

(56) References Cited

U.S. PATENT DOCUMENTS

| 4,175,789 | A | 11/1979 | Kube et al. |
|---|---|---|---|
| 6,012,329 | A | 1/2000 | Kelm-Klager et al. |
| 6,041,649 | A | 3/2000 | Fembock |
| 6,615,650 | B2 * | 9/2003 | Mahner ..................... 73/146 |
| 7,260,983 | B2 * | 8/2007 | Nosekabel et al. ............ 73/146 |
| 7,360,410 | B2 * | 4/2008 | Steinbichler et al. .......... 73/146 |
| 7,456,973 | B2 | 11/2008 | Steinbichler et al. |
| 7,568,385 | B2 * | 8/2009 | Maehner et al. ............... 73/146 |

(Continued)

FOREIGN PATENT DOCUMENTS

DE    2913601 A1    11/1979

(Continued)

OTHER PUBLICATIONS

Search Report from related International Application No. PCT/EP2007/053073. (ISR/WO).

*Primary Examiner*—Andre J Allen
(74) *Attorney, Agent, or Firm*—Harter Secrest & Emery LLP; Stephen B. Salai, Esq.; Brian B. Shaw, Esq.

(57) ABSTRACT

The invention relates to a device for checking a tire, (6, 9), in particular, by means of an interferometric measuring method, wherein at least one first measuring probe (2) and a second measuring probe (3) are provided by means of which the tires (6, 9) can be scanned to give a measurement result. The device is further provided with a positioning means (4, 5, 7, 8), by means of which the first measuring probe (2) and the second measuring probe (3) may be displaced between a park position outside the tire (6, 9) and an observation position within the tire (6, 9). According to the invention, tires (6, 9) with a comparatively small rim diameter ($d_6$, $d_9$) may be checked by means of the first measuring probe (2) and the second measuring probe (3) being independently positionable in the park position or the observation position using the positioning means (4, 5, 7, 8).

19 Claims, 2 Drawing Sheets

U.S. PATENT DOCUMENTS

| | | | |
|---|---|---|---|
| 2001/0052259 A1* | 12/2001 | Mahner | 73/146 |
| 2003/0188574 A1* | 10/2003 | Weiss | 73/146 |
| 2005/0109091 A1* | 5/2005 | Steinbichler et al. | 73/146 |
| 2008/0158569 A1 | 7/2008 | Maehner et al. | |
| 2008/0202229 A1* | 8/2008 | Maehner et al. | 73/146 |
| 2009/0044615 A1* | 2/2009 | Steinbichler et al. | 73/146 |

FOREIGN PATENT DOCUMENTS

| | | |
|---|---|---|
| DE | 3624589 A1 | 1/1988 |
| DE | 4231578 A1 | 3/1994 |
| DE | 19731486 C2 | 1/1999 |
| DE | 19944314 A1 | 4/2001 |
| DE | 10333802 A1 | 2/2005 |
| EP | 0884560 B1 | 5/1998 |
| EP | 0884574 B1 | 12/1998 |
| EP | 1014036 B1 | 6/2000 |
| EP | 1284409 A1 | 2/2003 |
| EP | 1473539 A | 11/2004 |
| EP | 1477765 A1 | 11/2004 |
| EP | 434736 B1 | 3/2009 |

* cited by examiner

DEVICE AND METHOD FOR CHECKING A TIRE IN PARTICULAR BY MEANS OF AN INTERFEROMETRIC MEASURING METHOD

The invention relates to a device for testing a tyre, particularly by interferometric scanning. The device is provided with a first scanning head and a second scanning head for scanning the tyres to obtain a scanning result. The device is further provided with a positioning means for moving the first scanning head and the second scanning head between a parking position located outside of the tyre and a viewing position located within the tyre. The invention relates furthermore to a method for testing a tyre in which such a device can find application.

Tyres are subjected to material testing for quality inspection and to reduce safety risks, making it possible to recognize faulty locations, so-called defects. It is particularly in the case of used tyres to be retreaded that as a rule non-destructive material testing is done, ensuring a relatively fast series inspection. Often employed in industry for this purpose are optical methods of sensing such as, for example, holography or shearography also termed speckle pattern shearing interferometry, shearography is a relative interferometric sensing method which furnishes an image as the result showing the difference between two conditions of the test object staggered in time. To image the result, nowadays as a rule digitally, due to the increasing popularity of electronic image sensors, such as, for example, CCD sensors, it has thus become necessary to tweak the condition of the test object between two scannings by making use of a mechanical, thermal or pneumatic force. This is why for this reason devices for testing tyres comprise a pressure chamber which is either pressurized or evacuated so that the tyre located in the pressure chamber is deformed due to the change in pressure in thus being transformed from a first reference condition into a second scanned condition.

Unlike holography, shearography does not map the surface deformation of a test object but the gradients of the deformation. This is because shearography employs a so-called shearing element which is a shearoptic assembly, such as, for example, an optical wedge, an optical biprism or a Michelson interferometer generating image doubling, i.e. two images of the test object slightly staggered spatially which are overlayed to produce an interferogram due to the resulting interference. The shearogram characterizing the gradients of the deformation is generated by subtracting the intensities of the interferograms obtained in the reference condition and in the scanned condition, the shearogram indicating whether there has been a change in the location of a point to an adjoining point because of deformation of the test object. If so, this difference in the distance results in a local change in the distribution of the intensity, providing information as to a defect. Interferometric scanning based on speckle interferometry are described in DE 42 31 578 A1 and EP 1 014 036 B1.

Devices employed for testing a tyre by means of interferometric scanning are provided as a rule with at least one scanning head, comprising an illuminator and an imaging assembly. The illuminator is often formed by a laser or laser diodes emitting coherent light. The imaging assembly is usually a camera provided with a CCD or CMOS sensor. To obtain a meaningful result it is necessary to render the viewing field of the camera and the section of the tyre to be tested conform. This is usually done by positioning the scanning head in a viewing position and orienting it in a viewing direction to ensure, on the one hand, that the selected scanned detail of the tyre is fully located in the field of view of the camera, and, on the other, that details scanned in sequence overlap sufficiently to permit gapless testing. The viewing position and viewing direction of the scanning head depend on the dimensions of the tyre. Accordingly, devices are known from EP 1 284 409 A1 and DE 103 33 802 A1 which make it possible to scan the tyre optically, for example by means of so-called light slices for positioning and orienting the scanning head as a function of his data obtained in this way.

A tyre testing apparatus in which a tyre to be tested is arranged without rim and disc in a lying position in a pressure chamber is disclosed in German patent 199 44 314 A1. This tyre testing apparatus features several adjustable scanning heads which can be positioned at a predefined distance away from the inner circumferential surface, the inner side surface and the outer side surface of the tyre to test the carcass, a belting often sandwiched between the carcass and the tread as well as the sidewall of the tyre. The scanning heads each feature a illuminator and an imaging assembly arranged at an angle to each other permitting simultaneous testing of differing sections of the tyre for relatively fast testing.

The scanning heads are connected to a positioning means making it possible to move the scanning heads from a parking position located outside of the tyre and thus ensuring a replacement of the tyres being tested into a viewing position located within the tyre so as to test the inner circumferential surface or the inner sidewalls of the tyre. For this purpose the positioning means features an arm for positioning in the axial direction of the tyre and mounting the scanning heads. To position the scanning heads in the necessary viewing position and to orient them in the wanted viewing direction, the scanning heads are arranged adjustable in the radial direction of the tyre for rotation about an pivoting axis on the arm.

The drawback with this known tyre testing apparatus is that in their entirety the scanning heads are relatively bulky and thus the device is suitable only for testing tyres having a rim diameter which is sufficiently large to permit introducing the scanning heads into the interior of the tyre. Another drawback is that expedited testing achievable by providing a plurality of scanning heads is not needed in every application and due to the additional complications involved in analyzing the results of a plurality of scanning heads not always welcome. Apart from this, it has turned out to be a drawback with the known tyre testing apparatus that any defect or failure in one of the scanning heads involves the other scanning heads, shutting down the tyre testing apparatus because of all scanning heads needing to be moved to the parking position for replacement or repair of the one scanning head that is at fault.

The invention is based on the object of defining a device and a method for testing tyres by means of which tyres having a relatively small rim diameter can now also be tested.

This object is achieved by a device as it reads from claim 1 and a method as claimed in claim 15. Preferred aspects of the device and of the method are defined in claims 2 to 14 and 16 to 18.

The device in accordance with the invention for testing a tyre is provided with at least one first scanning head and a second scanning head for scanning the tyre to obtain a resulting scan. The scanning heads are configured, for example, as described in EP 1 014 036 B1 for testing the tyre by means of interferometric scanning. The device in accordance with the invention is furthermore provided with a positioning means for moving the scanning heads between a parking position located outside of the tyre and a viewing position located within the tyre. In this arrangement the first scanning head and second scanning head are positionable each independently of the other by the positioning means in the parking position and/or viewing position.

The method in accordance with the invention for testing a tyre comprises the steps;
a) locating a tyre to be tested in a testing device comprising at least one first scanning head and a second scanning head;
b) moving the first scanning head by a positioning means from a parking position outside of the tyre into a viewing position within the tyre.
c) moving as a function of the dimension of the tyre the second scanning head by the positioning means independently of the first scanning head from a parking position outside of the tyre into a viewing position within the tyre and
d) scanning the tyre either by the first scanning head or simultaneously by the first scanning head and second scanning head.

The invention is based on having discovered that by configuring the positioning means permitting movement of the first scanning head and second scanning head each independently of the other now making it possible to optionally position just one or both scanning heads in the interior of the tyre. When the tyre to be tested has a rim diameter which is relatively small, as is often the case with aircraft tyres, then it is expedient to position just one scanning head in the viewing position within the tyre. But when the tyre to be tested has a rim diameter large enough to introduce both the first scanning head and the second scanning head into the interior of the tyre, expediently both scanning heads are positioned in the interior of the tyre to expedite testing the inner circumferential surface and/or inner sidewall of the tyre.

The invention is not restricted to two scanning heads. Instead, three, four or also more scanning heads may be provided each of which can be positioned independently of the other in the parking position and/or viewing position. It is particularly when a larger number of scanning heads is provided that it is especially convenient that the scanning heads can be introduced into the interior of the tyre one after the other, because of each being independently positionable in the wanted viewing position and oriented in the viewing direction. As compared to the tyre testing apparatus known from German patent DE 199 44 314 A1 in which the scanning heads cannot be introduced one after the other into the interior of the tyre, but only together, the device in accordance with the invention now makes it possible to position a plurality of scanning heads in a viewing position located within the tyre for the same rim diameter. In other words, the device in accordance with the invention permits exploiting the cavity of the tyre as defined by the width and height of the tyre for positioning the scanning heads in the interior of the tyre.

Preferably the positioning means is configured so that the scanning heads can be positioned in both the parking position and the viewing position each independently of the other, achieving a redundant configuration contributing towards high functional reliability. For, should there be a defect in one scanning head, it can be moved into the parking position and the tyre tested by the other scanning head or other scanning heads if more than two scanning heads are provided. But, depending on the application, it may be sufficiently when the scanning heads are positionable in just the viewing position, each independently of the other and moved from a position intermediate between the viewing position and the parking position in common into the parking position.

In one preferred aspect of the device in accordance with the invention the first scanning head and the second scanning head are moveable by the positioning means in an axial direction. Expediently, the positioning means in this case features a first positioner for moving the first scanning head in the axial direction and a second positioner for moving the second scanning head in the axial direction, the positioners each configured for example as a linear guide or linear motor can be controlled to position the scanning heads in the parking position or viewing position each independently of the other.

In another preferred aspect of the device in accordance with the invention the first scanning head and/or the second scanning head are moveable by the positioning means in a radial direction to ensure that the scanning heads can be positioned in the necessary viewing position. In this case the positioning means includes expediently a third positioner for moving the first scanning head in the radial direction and a fourth positioner for moving the second scanning head in the radial direction, the positioners, here too for example, each being configured as a linear guide or linear motor each controlled independently of the other to ensure freedom of movement of the scanning heads in the radial direction.

Preferably the first positioner is coupled to the third positioner whereas preferably the second positioner is coupled to the fourth positioner. Such a configuration is especially of advantage when the positioners are each configured as a linear guide or linear motor.

It is good practice to test the tyres lying in which case the axial direction is oriented vertically, whereas the radial direction is oriented horizontally. It may, however, prove expedient, depending on the particularly application, to test the tyres in an upright position, resulting in the axial direction being oriented horizontally. Such a configuration is especially of advantage when the tyre to be tested is comparatively heavy and thus flipping the tyre over is more complicated.

Preferably the first scanning head and/or the second scanning head are rotatable relative to the tyre about an axis of rotation or rolling axis extending in the axial direction so that the tyre can be totally scanned circumferentially by the scanning heads. To orient the scanning heads in the necessary viewing direction it is furthermore of advantage when the first scanning head and/or the second scanning head are rotatable about a pivoting axis oriented preferred orthogonal to the axis of rotation.

In still another preferred aspect the device in accordance with the invention comprises a pressure chamber in which the tyre to be tested can be subjected to a predetermined pressure. Such a configuration is of advantage when the tyre is tested by means of interferometric scanning so that a change in the pressure in the pressure chamber produces a deformation of the tyre as needed for such a scanning method. The device in accordance with the invention is expediently provided with a baseframe on which the pressure chamber is arranged and which supports the tyre during testing. In this case it has been discovered to be particularly an advantage when the tyre is mounted rotatable about the axis of rotation on the baseframe. For, this eliminates the need to configure the positioning means positioning the scanning heads rotatable in thus enabling the positioning means to be engineered simpler because of the free positioning capability of the scanning heads.

For implementing interferometric scanning the first scanning head and/or the second scanning head preferably include an illuminator for illuminating the tyre, a shearing element for producing interference with the light beams reflected by the tyre and an electronic image sensor disposed in the beam path of the shearing element to receive the interference light beams. Depending on the particular application the illuminator formed, for example, by laser diodes may be configured either as an integral component of the scanning head or separate therefrom.

In one preferred aspect of the method in accordance with the invention and depending on the dimension of the tyre, particularly the rim diameter, the width and height of the tyre and/or the necessary viewing position, the number of scanning heads to be positioned within the tyre in a viewing position is automatically selected by a controller controlling the positioning means to achieve user-friendly tyre testing. The dimension of the tyre is expediently saved in a memory of the controller. The dimension of the tyre can be saved in test routines specific to the tyres concerned as loaded in the memory of the controller or sensed prior to testing the tyre, for example by means of so-called light slices as known from EP 1 284 409 A1.

Preferably the tyre is rotated about an axis of rotation extending in the axial direction for totally scanning the tyre circumferentially.

In yet another preferred aspect of the method in accordance with the invention the tyre is disposed in a pressure chamber and exposed to a predetermined pressure for performing scanning in which the scanning heads interferometrically map a deformation of the tyre resulting from a change in pressure in the pressure chamber.

Details and further advantages of the invention read from the following description of a preferred example aspect. In the drawings illustrating the example aspect simply diagrammatically:

Figure 1:
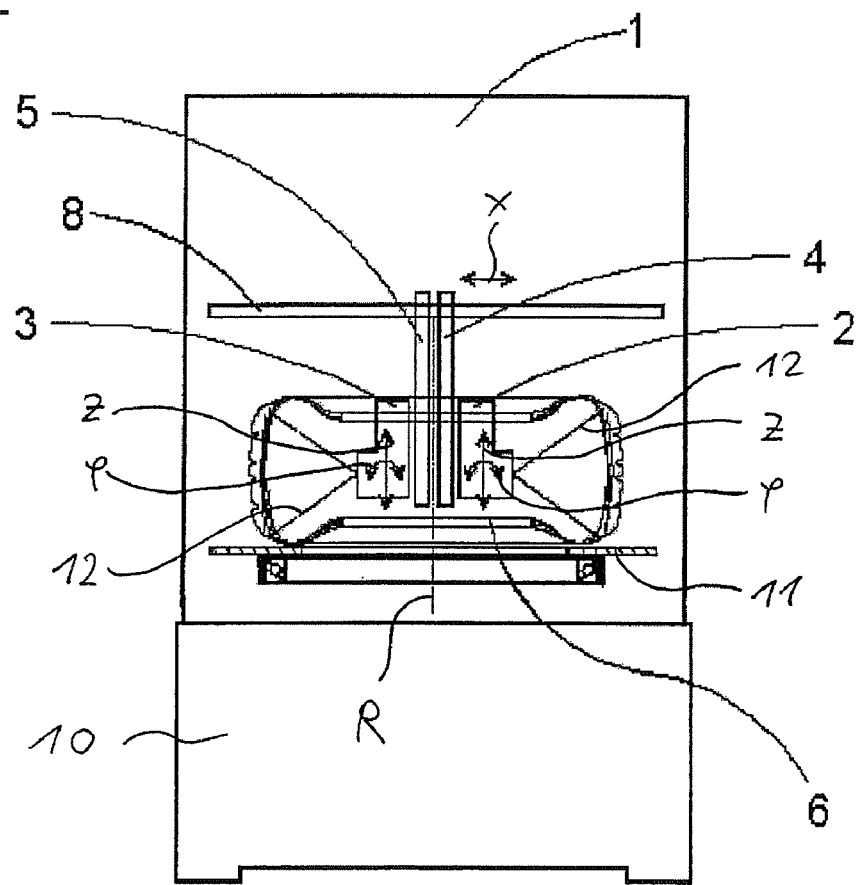
FIG. 1 is a side view of a device for testing a tyre having a relatively large rim diameter.
Figure 2:
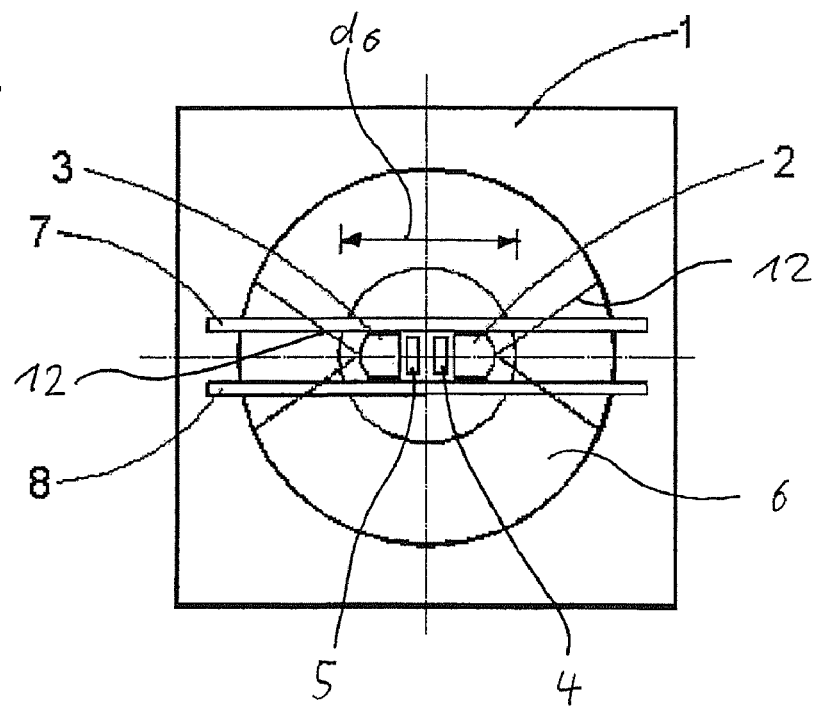
FIG. 2 is a top-down view of the device as set forth in FIG. 1.

Referring now to FIGS. 1 and 2 there is illustrated how a device for testing a tyre 6 comprises a pressure chamber 1 configured as a hood located on a baseframe 10. The pressure chamber 1 is mounted for movement in the viewing direction so that a tyre 6 to be tested in the pressure chamber 1 can be loaded and unloaded by elevating the pressure chamber. In the closed position as shown in FIG. 1 the pressure chamber 1 is seated on the baseframe 10 sealed off from the ambience so that by means of a pump (not shown) a prescribed pressure can be set in the pressure chamber 1. The pressure existing in the pressure chamber 1 may be positive or negative, it being good practice in industry to select atmospheric pressure as the reference condition and a negative pressure as the scanning condition to which the pressure chamber 1 is evacuated.

The baseframe 10 features a turntable 11 on which the tyre 6 is mounted lying. Because of the lying arrangement of the tyre 6 the axial direction z of the tyre 6 is oriented vertically and the radial direction x of the tyre 6 horizontally. The turntable 11 permits rotation of the tyre 6 about an axis of rotation R extending in the axial direction z.

Referring still to FIGS. 1 and 2 there is illustrated furthermore how arranged in the pressure chamber 1 is a positioning means comprising a first positioner 4, a second positioner 5, a third positioner 7 and a fourth positioner 8 each of which is designed as a linear guide or linear motor. The positioners 4, 5 permits linear motion in the axial direction z whereas the positioners 7, 8 effect linear motion in the radial direction x. The positioner 4 is coupled to the positioner 7 and the positioner 5 is coupled to the positioner 8, it being in this way that the positioners 4, 5 can be moved by the positioners 7, 8 in the radial direction x.

The positioners 4, 5 each feature a scanning head 2, 3. The scanning heads 2, 3 for pivoting about a pivoting axis oriented orthogonal to the axis of rotation R and mounted rotatable at the positioners 4, 5 and thus for setting the wanted viewing direction in a pivoting direction φ may be configured as known from EP 1 014 036 B1 for testing a tyre 6 by means of interferometric scanning. Accordingly, the scanning heads 2, 3 may feature an objective lens having a field of view 12, a camera provided with a semiconductor sensor, for example a CCD or CMOS sensor, an illuminator which may be formed, for example, by a plurality of laser diodes, and a shearing element composed, for example, of a beam splitter, a moving mirror and a stationary mirror.

For interferometric testing, the tyre 6 is illuminated by means of the illuminator emitting coherent light, it usually being the case that to test the inner circumferential surface of the tyre 6 both the belting of the tyre 6 as well as the bead of the tyre 6 located in the transition from the tread to the sidewalls are illuminated. The sidewalls of the tyre 6 are generally illuminated from without, but may also be illuminated from within when the tyre is sufficiently wide. The light beams reflected by the surface of the tyre 6 are received by means of the objective lens and imaged on the shearing element with the aid of which interference is created. The interference light beams are mapped by means of the camera arranged in the beam path of the shearing element to create an interferogram. The scanning heads 2, 3 are connected to an electronic analyzer which analyzes the interferograms to produce a shearogram showing any surface deformation of the tyre 6 from the, for example, differing conditions of the tyre 6 materializing from the change in pressure in the pressure chamber 1.

The scanning head 2, 3 can be positioned by means of the positioners 4, 7 in the axial direction z and in the radial direction x, in being movable in this way between a parking position located outside of the tyre 6 and a viewing position within the tyre 6 and as shown in FIG. 1. The scanning head 3 can be moved by means of the positioners 5, 8 likewise between a parking position located outside of the tyre 6 and a viewing position within the tyre 6. Each positioner 4, 5, 7, 8 can be controlled independently of the other so that each scanning head 2, 3 can be positioned independently of the other in both the parking position and the viewing position. For controlling the positions 4, 5, 7, 8 a controller is used as may be integrated in the electronic analyzer to which the scanning heads 2, 3 are connected. The controller comprises a memory in which the dimensions of the tyre 6, 9 to be tested, particularly the rim diameter $d_6$, $d_9$, width and height of the tyre are saved. Depending on the dimension concerned of the tyre 6, 9 the number of scanning heads 2, 3 to be positioned within the tyre 6, 9 in a viewing position is automatically selected by the controller.

Figure 3:
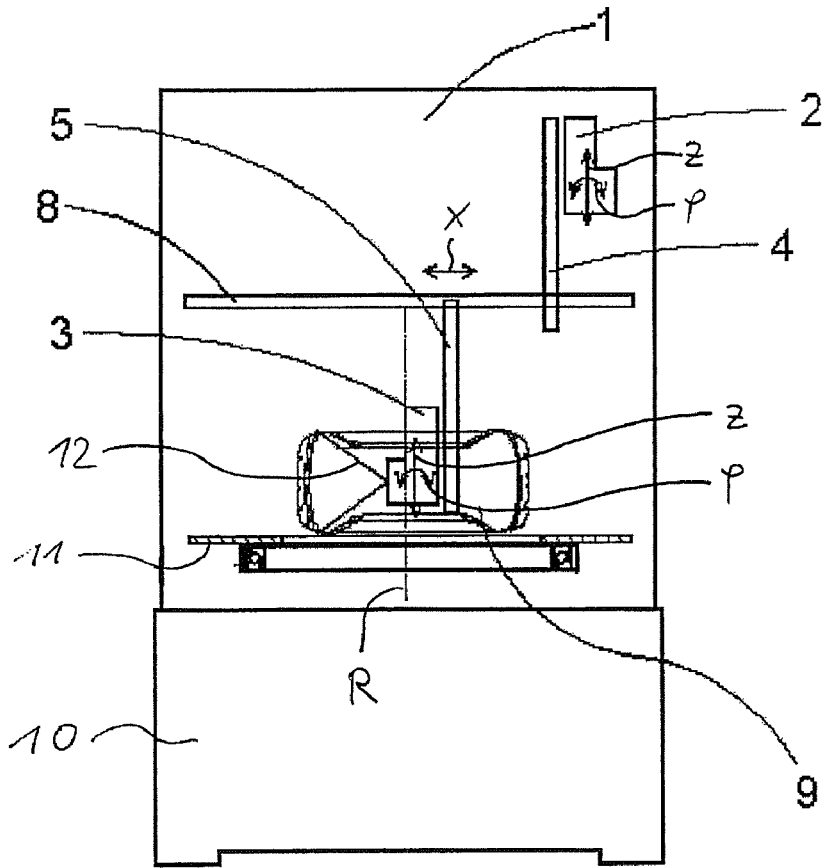
FIG. 3 is a side view of a device for testing a tyre having a relatively small rim diameter.
Figure 4:
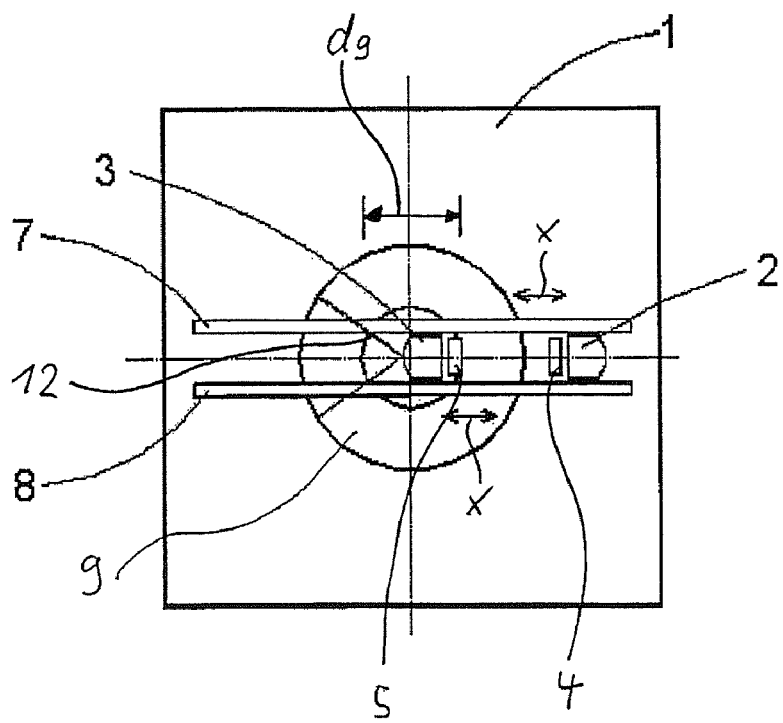
FIG. 4 is a top-down view of the device as set forth in FIG. 3.

Referring still to FIGS. 1 and 2 there is illustrated how the tyre 6 has a rim diameter $d_6$ which is large as compared to the dimensions of the scanning heads 2, 3 as determined mainly by the shearing element and the camera, whereas when referring now to FIGS. 3 and 4 the tyre 9 to be tested has a relatively small rim diameter dg. The rim diameter $d_6$ of the tyre 6 is large enough so that both scanning heads 2, 3 can be positioned within the tyre 6 by means of the positions 4, 5, 7, 8 to expedite testing. But the rim diameter dg of the tyre 9 permits positioning of only one of the scanning heads 2, 3 in a viewing position located within the tyre. Because of the scanning heads 2, 3 being independently positionable, it is possible to optionally introduce the scanning head 2 or as shown in FIG. 3 or the scanning head 3 into the interior of the tyre 9 to assume the viewing position within the tyre 9. The other scanning head 2 remains in the parking position outside of the tyre 9 in thus assuring unobstructed maneuvering of the scanning head 3 to assume the viewing position.

The device as described above for testing a tyre 6, 9 is characterized by its universal configuration making it possible to test tyres 6, 9 having differing dimensions. The main reason for this is the scanning heads 2, 3 being independently adjustable which now make it additionally possible to test tyre 6 having a sufficiently large rim diameter $d_6$ simultaneously by a plurality of scanning heads 2, 3 expediting testing. Last but no least, the device makes for high functional reliability since because the scanning heads 2, 3 are independently adjustable they are redundant.

LIST OF REFERENCE NUMERALS

1 pressure chamber
2 first scanning head
3 second scanning head
4 first positioner
5 second positioner
6 large rim diameter tyre
7 third positioner
8 fourth positioner
9 small rim diameter tyre
10 baseframe
11 turntable
12 field of view
$d_6$ rim diameter
$d_9$ rim diameter
R axis of rotation
φ pivoting direction
x radial direction
z axial direction

The invention claimed is:

1. A device for testing a tire, particularly by interferometric scanning, comprising:
  at least one first scanning head and a second scanning head for scanning the tire to obtain a resulting scan;
  a positioning means for moving the first scanning head and the second scanning head between a parking position located outside of the tire and a viewing position located within the tire; and
  in which the first scanning head and second scanning head are positionable each independently of the other by the positioning means in the parking position or viewing position.

2. The device as set forth in claim 1, in which the first scanning head and the second scanning head are moveable in an axial direction by the positioning means.

3. The device as set forth in claim 2, in which the positioning means comprise a first positioner for moving the first scanning head in the axial direction and a second positioner for moving the second scanning head in the axial direction, the first positioner and second positioner being controllable each independently of the other.

4. The device as set forth in claim 1, in which the first scanning head or the second scanning head are moveable in a radial direction by the positioning means.

5. The device as set forth in claim 4, in which the positioning means comprises a third positioner for moving the first scanning head in the radial direction and a fourth positioner for moving the second scanning head in the radial direction, the third positioner and fourth positioner being controllable each independently of the other.

6. The device as set forth in claim 5, in which the first positioner is coupled to the third positioner.

7. The device as set forth in claim 5, in which the second positioner is coupled to the fourth positioner.

8. The device as set forth in claim 4, in which the axial direction is oriented vertically and the radial direction horizontally.

9. The device as set forth in claim 1, in which relative to the tire the first scanning head or the second scanning head is rotatable about an axis of rotation extending in the axial direction.

10. The device as set forth in claim 9, in which the first scanning head or the second scanning head is rotatable about a pivoting axis oriented orthogonal to the axis of rotation.

11. The device as set forth in claim 1, characterized by a pressure chamber in which the tire to be tested is exposable to a predetermined pressure.

12. The device as set forth in claim 11, characterized by a baseframe on which the pressure chamber is arranged.

13. The device as set forth in claim 12, in which the tire is rotatably mounted about the axis of rotation on the baseframe.

14. The device as set forth in claim 1, in which the first scanning head or the second scanning head comprises an illuminator for illuminating the tire, a shearing element for producing interference with the light beams reflected by the tire, and an electronic image sensor disposed in the beam path of the shearing element to receive the interference light beams.

15. A method for testing a tire particularly by interferometric scanning, comprising the steps:
  a) locating a tire to be tested in a testing device comprising at least one first scanning head and a second scanning head;
  b) moving the first scanning head by a positioning means from a parking position outside of the tire into a viewing position within the tire;
  c) moving, as a function of the dimension of the tire, the second scanning head by the positioning means independently of the first scanning head from a parking position outside of the tire into a viewing position within the tire; and
  d) scanning the tire either by the first scanning head or simultaneously by the first scanning head and second scanning head.

16. The method as set forth in claim 15, in which as a function of the dimension of the tire the number of scanning heads to be positioned in a viewing position within the tire is automatically selected by a controller.

17. The method as set forth in claim 15, in which the tire is rotated about an axis of rotation extending in the axial direction.

18. The method as set forth in claim 15, in which the tire is disposed in a pressure chamber and exposed to a predetermined pressure.

19. The method as set forth in claim 18, in which the first scanning head and the second scanning head interferometrically map a deformation of the tire resulting from a change in pressure in the pressure chamber.

* * * * *